US010498700B2

(12) United States Patent
Wackerly

(10) Patent No.: US 10,498,700 B2
(45) Date of Patent: Dec. 3, 2019

(54) TRANSMITTING NETWORK TRAFFIC IN ACCORDANCE WITH NETWORK TRAFFIC RULES

(71) Applicant: HEWLETT PACKARD ENTERPRISE DEVELOPMENT LP, Houston, TX (US)

(72) Inventor: Shaun Wackerly, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/117,473

(22) PCT Filed: Mar. 25, 2014

(86) PCT No.: PCT/US2014/031640
§ 371 (c)(1),
(2) Date: Aug. 9, 2016

(87) PCT Pub. No.: WO2015/147793
PCT Pub. Date: Oct. 1, 2015

(65) Prior Publication Data
US 2016/0352686 A1 Dec. 1, 2016

(51) Int. Cl.
*H04L 29/06* (2006.01)
*H04L 12/64* (2006.01)
(52) U.S. Cl.
CPC ...... *H04L 63/0263* (2013.01); *H04L 12/6418* (2013.01); *H04L 63/20* (2013.01)
(58) Field of Classification Search
USPC .......................................................... 726/1
See application file for complete search history.

(56) References Cited

U.S. PATENT DOCUMENTS

| 8,416,796 B2 | 4/2013 | Forster et al. |
| 8,521,856 B2 | 8/2013 | Davis |
| 8,615,785 B2 * | 12/2013 | Elrod .................. H04L 63/1416 370/245 |

(Continued)

OTHER PUBLICATIONS

International Search Report and Written Opinion, International Application No. PCT/US2014/031640, dated Dec. 11, 2014, pp. 1-9, KIPO.

(Continued)

*Primary Examiner* — Harris C Wang
(74) *Attorney, Agent, or Firm* — Park, Vaughan, Fleming & Dowler LLP

(57) ABSTRACT

In an example implementation according to aspects of the present disclosure, a method may include identifying, by a computing system, an infrastructure device and an end-host device within a network. The method may further include disseminating, by the computing system, network traffic rules to the infrastructure device, the network traffic rules to route network traffic between end-host devices through the infrastructure device. Further, the network traffic transmitted from a first end-host device to a second end-host device is passed through the infrastructure device to the second end-host device in accordance with the network traffic rules, and network traffic transmitted from the first end-host device to the infrastructure device is blocked by the infrastructure device in accordance with the network traffic rules.

17 Claims, 3 Drawing Sheets

(56) References Cited

U.S. PATENT DOCUMENTS

| | | | |
|---|---|---|---|
| 2006/0026679 A1* | 2/2006 | Zakas | H04L 29/06 |
| | | | 726/22 |
| 2007/0192862 A1 | 8/2007 | Vermeulen et al. | |
| 2008/0113652 A1* | 5/2008 | Liu | H04L 67/16 |
| | | | 455/414.1 |
| 2008/0189769 A1 | 8/2008 | Casado et al. | |
| 2008/0250123 A1* | 10/2008 | Chae | H04L 29/12028 |
| | | | 709/220 |
| 2009/0172156 A1 | 7/2009 | Yadav et al. | |
| 2012/0311664 A1 | 12/2012 | Elrod et al. | |
| 2013/0054784 A1 | 2/2013 | Yadav et al. | |
| 2013/0070762 A1* | 3/2013 | Adams | H04L 49/70 |
| | | | 370/389 |
| 2013/0227166 A1 | 8/2013 | Ravindran et al. | |
| 2015/0288709 A1* | 10/2015 | Singhal | H04L 63/102 |
| | | | 726/23 |
| 2016/0173334 A1* | 6/2016 | Gavrilovic | H04L 69/16 |
| | | | 709/222 |
| 2016/0352686 A1* | 12/2016 | Wackerly | H04L 63/0263 |

OTHER PUBLICATIONS

Seugwon Shin et al., "FRESCO: Modular Composable Security Services for Software-Defined Networks," Feb. 2013, pp. 1-16, Available at: <csl.sri.com/users/vinod/papers/fresco.pdf>.

* cited by examiner

TRANSMITTING NETWORK TRAFFIC IN ACCORDANCE WITH NETWORK TRAFFIC RULES

BACKGROUND

Computing devices, such as laptops, desktops, mobile phones, tablets, and the like often utilize resources including services, data, and applications within an electronic communication network. Consequently, networks of these computing devices have grown in size and complexity. These networks may include various infrastructure devices, such as switches, routers, hubs, and the like, which connect to and provide the network for the computing devices.

BRIEF DESCRIPTION OF THE DRAWINGS

The following detailed description references the drawings, in which.

DETAILED DESCRIPTION

Figure 1:
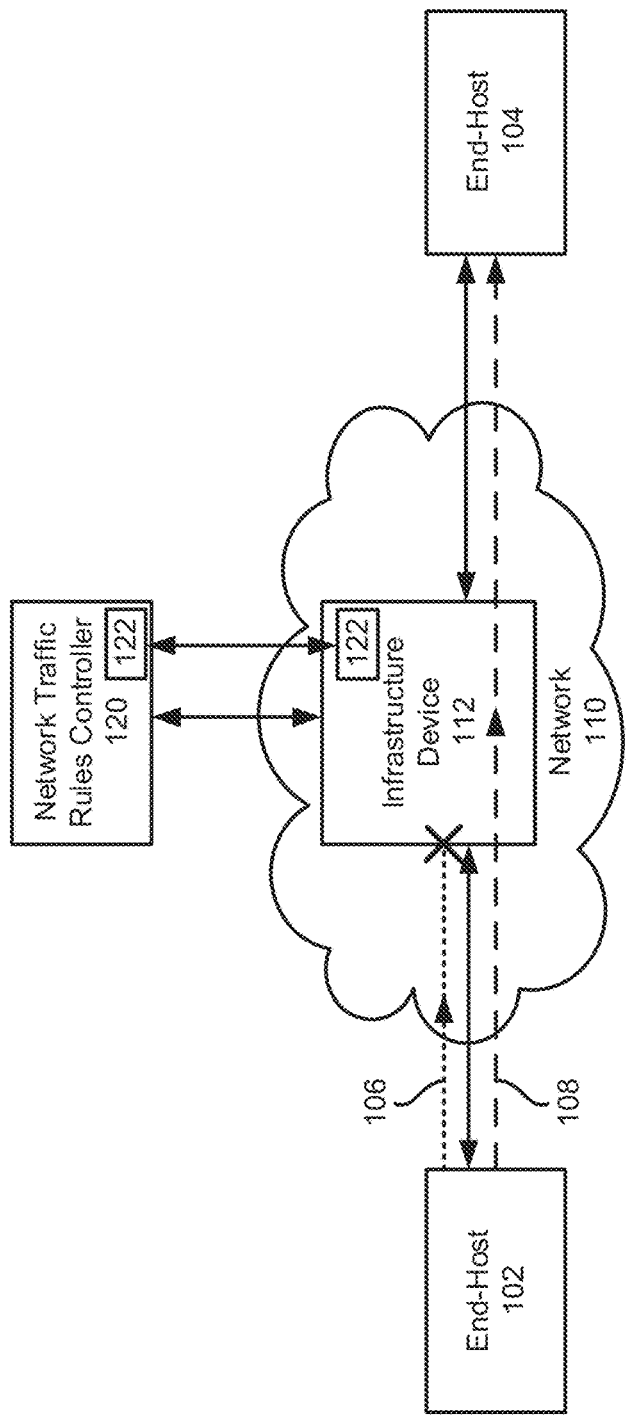
FIG. 1 illustrates a block diagram of a system for transmitting network traffic in accordance with network traffic rules according to examples of the present disclosure.

Electronic communication networks may include a variety of devices, including networked end-host devices (e.g., a user computing device) and networked infrastructure devices (e.g., network switches, routers, hubs, etc.). Through the network, these interconnected devices communicate by transmitting and receiving data packets. For example, a first end-host device may transmit a data packet to a second end-host device through an infrastructure device such as a network switch designed to forward the data packets accordingly.

To direct the network packets appropriately, network infrastructure devices have addressing schemes such as MAC addresses, IP/IPv6 addresses, and the like for communications purposes. The networking infrastructure devices may support a variety of services that may not need to interact with the networked end-host devices. However, the addressing schemes may still be visible to end-hosts. Consequently, the networked infrastructure devices may be vulnerable to security attacks from the networked end-host devices with which they are allowed to communicate. By attacking the network infrastructure, a malicious end-host may deny services and/or snoop network packets from other networked end-hosts connected to the network.

Previously, network administrators attempted to block end-host communication to specific infrastructure devices by creating network traffic routing rules through manual administrator configuration. This can be a time consuming, costly, and complex endeavor because it depends on the network administrator to reflect network configuration and architecture changes in one part of the network by changing the network traffic routing rules through manual administrator configuration for the entire network's configuration as soon as those changes occur. Failure to implement the manual changes to the rules results in network venerability and insecurity. Consequently, a network administrator needs to be available to update the network traffic routing rules whenever such changes occur, which may be very frequently in large and/or complex networks.

Various implementations are described below by referring to several examples of techniques for transmitting network traffic in accordance with network traffic rules. In an example implementation according to aspects of the present disclosure, a method may include identifying, by a computing system, an infrastructure device and an end-host device within a network. The method may further include disseminating, by the computing system, network traffic rules to the infrastructure device, the network traffic rules to route network traffic between end-host devices through the infrastructure device. Further, the network traffic transmitted from a first end-host device to a second end-host device is passed through the infrastructure device to the second end-host device in accordance with the network traffic rules, and network traffic transmitted from the first end-host device to the infrastructure device is blocked by the infrastructure device in accordance with the network traffic rules.

In some implementations, the network infrastructure devices are protected from malicious network traffic from end-host devices. Moreover, the techniques described herein reduce the time, costs, and complexity associated with manual network traffic routing rules configuration maintenance. These and other advantages will be apparent from the description that follows.

FIG. 1 illustrates a block diagram of a system for transmitting network traffic in accordance with network traffic rules according to examples of the present disclosure. FIG. 1 includes particular components, modules, etc. according to various examples. However, in different implementations, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

As shown in FIG. 1, a network traffic rules controller 120 is communicatively coupled to an infrastructure device 112, which is also communicatively coupled to end-hosts 102 and 104 within a network 110. It should be noted that the network 110 may include all of the devices shown, as well as additional devices.

It should be understood that the network traffic rules controller 120 may be a computing system such as any appropriate type of computing device, including for example smartphones, tablets, desktops, laptops, workstations, servers, smart monitors, smart televisions, digital signage, scientific instruments, retail point of sale devices, video walls, imaging devices, peripherals, or the like, or any combination or portion thereof.

The network traffic rules controller 120 may include a processing resource that represents generally any suitable type or form of processing unit or units capable of processing data or interpreting and executing instructions. The instructions may be stored on a non-transitory tangible computer-readable storage medium, such as a memory resource, or on a separate device, or on any other type of volatile or non-volatile memory that stores instructions to cause a programmable processor to perform the techniques described herein. Alternatively or additionally, the network traffic rules controller 120 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory. In other examples, the network traffic rules controller 120 may include modules or engines made up of hardware and/or software to execute programmatic instructions to perform the processes and methods described herein.

The network 110 represents generally hardware components and computers interconnected by communications channels that allow sharing of resources and information. The network 110 may include one or more of a cable, wireless, fiber optic, or remote connection via a telecommunication link, an infrared link, a radio frequency link, or any other connectors or systems that provide electronic communication. The network 110 may include, at least in part, an Intranet, the internet, or a combination of both. The network 110 may also include intermediate proxies, routers, switches, load balancers, and the like, such as infrastructure device 112. The paths followed by the network 110 among the end-hosts 102 and 104, the infrastructure device 112, and the network traffic rules controller 120 as depicted in FIG. 1 represent the logical communication paths between these devices, not necessarily the physical paths between the devices. In examples, the network 110 may be a software defined network or the like.

The network traffic rules controller 120 generates network traffic rules 122 to route network traffic between the end-hosts 102 and 104 through the infrastructure device 112 and then disseminates the network traffic rules 122 to the infrastructure device 112. In examples, the network traffic rules controller 120 also identifies devices connected to the network, including at least the infrastructure device 112 and the end-hosts 102 and 104. Identifying the infrastructure device and/or the end-hosts within the network may be based, in part or in whole, on the internet protocol (IP) address, media access control (MAC) address, other addressing scheme, traffic type, and/or application function of the device. Additional devices may also be detected. In examples, the network traffic rules controller 120 may periodically (such as once a day, every hour, every few seconds, or any other appropriate interval) or continuously attempt to identify changes to the infrastructure devices and/or end-host devices, such as the modification, addition, or removal of infrastructure and/or end-host devices.

In an example, the network traffic rules controller 120 may also include functionality to act as a software defined networking controller such as to enable the control plane to communicate with the data plane, using, for example, OpenFlow or another similar mechanism.

The infrastructure device 112, which may include a network switch, router, hub, or other similar network appliance, transmits network traffic transmitted or sent from one of the end-hosts to another of the end-hosts while refusing network traffic transmitted from one of the end-hosts to the infrastructure device 112 in accordance with the network traffic rules 122. For example, network traffic sent by the end-host 102 to the end-host 104 is sent through the infrastructure device 112 to the end-host 104 in accordance with the network traffic rules 122. In FIG. 1, this is depicted by the dashed line 108 showing network traffic sent from end-host 102 to the end-host 104 through the infrastructure device 112. In other examples, network traffic may be logged or recorded by the infrastructure device (or an appropriate attached device) but allowed to be received by the infrastructure device. This allows for flexibility and post-mortem analysis if a breach occurs. The network traffic may also be redirected to an analysis engine elsewhere in the network and the network traffic may be then allowed or denied by the infrastructure device based on an analysis performed by the analysis engine.

In an example, network traffic transmitted from one of the end-host devices to another of the end-host devices is passed through the infrastructure device based at least in part on a media access control (MAC) address. In this case, the infrastructure device 112 stores a MAC address forwarding or routing table to forward or route the network traffic appropriately. Similarly, network traffic transmitted from one of the end-host devices to another of the end-host devices is passed through the infrastructure device based at least in part on an internet protocol (IP) address. In this case, the infrastructure device 112 stores an IP address forwarding or routing table to forward or route the network traffic appropriately.

The infrastructure device 112 may also deny, refuse, or drop network traffic based on an application type. For example, if network traffic is related to a certain type of application, it may be refused by the infrastructure device 112. Other type of network traffic may also be denied, dropped, or refused in accordance with the network traffic rules 122. In examples, the network traffic rules 122 may be applied at the application layer, presentation layer, session layer, transport layer, network layer, data link layer, and/or physical layer, as appropriate.

However, if the end-host 102 sends network traffic directly to the infrastructure device 112, that network traffic is denied, refused, and/or dropped by the infrastructure device 112 in accordance with the network traffic rules 122. As shown by the dotted line 106 in FIG. 1, the network traffic is refused by the infrastructure device 112. This prevents unauthorized, potentially harmful network traffic from being received by the infrastructure device 112, which could then potentially infect other devices within the network 110. Similarly, if any other end-host (such as end-host 104) sends network traffic directly to any of the infrastructure devices (such as infrastructure device 112), the traffic is denied by the infrastructure device or treated as otherwise described herein.

Figure 2:
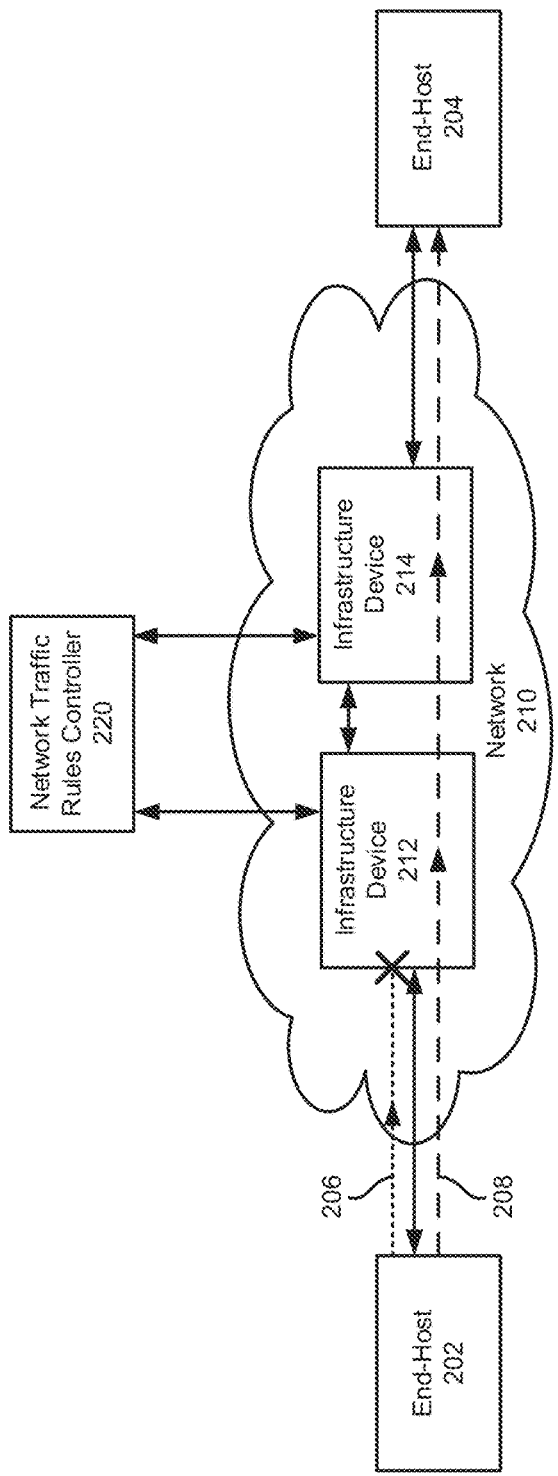
FIG. 2 illustrates a block diagram of a system for transmitting network traffic in accordance with network traffic rules according to examples of the present disclosure.

In other examples, such as shown in FIG. 2 and discussed below, the network 110 may include a second infrastructure device. More particularly, FIG. 2 illustrates a block diagram of a system for transmitting network traffic in accordance with network traffic rules 122 according to examples of the present disclosure.

FIG. 2 includes particular components, modules, etc. according to various examples. However, in different implementations, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

As shown in FIG. 2, a network traffic rules controller 220 is communicatively coupled to infrastructure devices 212 and 214, which are communicatively coupled together and also to end-hosts 202 and 204 within a network 210. It should be noted that the network 210 may include all of the devices shown, as well as additional devices.

It should be understood that the network traffic rules controller 220 may be a computing system such as any appropriate type of computing device, including for example smartphones, tablets, desktops, laptops, workstations, servers, smart monitors, smart televisions, digital signage, scientific instruments, retail point of sale devices, video walls, imaging devices, peripherals, or the like, or any combination or portion thereof.

The network traffic rules controller 220 may include a processing resource that represents generally any suitable type or form of processing unit or units capable of processing data or interpreting and executing instructions. The instructions may be stored on a non-transitory tangible computer-readable storage medium, such as a memory resource, or on a separate device, or on any other type of volatile or non-volatile memory that stores instructions to cause a programmable processor to perform the techniques described herein. Alternatively or additionally, the network traffic rules controller 120 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory. In other examples, the network traffic rules controller 220 may include modules or engines made up of hardware and/or software to execute programmatic instructions to perform the processes and methods described herein.

The network 210 represents generally hardware components and computers interconnected by communications channels that allow sharing of resources and information. The network 210 may include one or more of a cable, wireless, fiber optic, or remote connection via a telecommunication link, an infrared link, a radio frequency link, or any other connectors or systems that provide electronic communication. The network 210 may include, at least in part, an Intranet, the internet, or a combination of both. The network 210 may also include intermediate proxies, routers, switches, load balancers, and the like, such as infrastructure devices 212 and 214. The paths followed by the network 210 among the end-hosts 202 and 204, the infrastructure devices 212 and 214, and the network traffic rules controller 220 as depicted in FIG. 2 represent the logical communication paths between these devices, not necessarily the physical paths between the devices. In examples, the network 210 may be a software defined network or the like.

The network traffic rules controller 220 generates network traffic rules to route network traffic between the end-hosts 202 and 204 through the infrastructure devices 212 and 214 and then disseminates the network traffic rules to the infrastructure devices 212 and 214. In examples, the network traffic rules controller 220 also identifies devices connected to the network, including at least the infrastructure devices 212 and 214 and the end-hosts 202 and 204. Identifying the infrastructure device and/or the end-hosts within the network may be based, in part or in whole, on the internet protocol (IP) address, media access control (MAC) address, other addressing schemes, traffic type, and/or application function of the device. Additional devices may also be detected. In examples, the network traffic rules controller 220 may periodically (such as once a day, every hour, every few seconds, or any other appropriate interval) or continuously attempt to identify changes to the infrastructure devices and/or end-host devices, such as the modification, addition, or removal of infrastructure and/or end-host devices.

In an example, the network traffic rules controller 220 may also include functionality to act as a software defined networking controller such as to enable the control plane to communicate with the data plane, using, for example, OpenFlow or another similar mechanism.

The infrastructure devices 212 and 214, which may include network switches, routers, hubs, and/or other similar network appliance, transmit network traffic transmitted or sent from one of the end-hosts to another of the end-hosts while refusing network traffic transmitted from one of the end-hosts to the infrastructure devices 212 and 214 in accordance with the network traffic rules. For example, network traffic sent by the end-host 202 to the end-host 204 is sent through the infrastructure devices 212 and 214 to the end-host 204 in accordance with the network traffic rules. In FIG. 2, this is depicted by the dashed line 208 showing network traffic sent from end-host 202 to the end-host 204 through the infrastructure devices 212 and 214.

In an example, network traffic transmitted from one of the end-host devices to another of the end-host devices is passed through the infrastructure devices based at least in part on a media access control (MAC) address. In this case, the infrastructure devices 212 and/or 214 store a MAC address forwarding or routing table(s) to forward or route the network traffic appropriately. Similarly, network traffic transmitted from one of the end-host devices to another of the end-host devices is passed through the infrastructure devices based at least in part on an internet protocol (IP) address. In this case, the infrastructure devices 212 and/or 214 store an IP address forwarding or routing table(s) to forward and/or route the network traffic appropriately.

The infrastructure devices 212 and 214 may also deny, refuse, or drop network traffic based on an application type. For example, if network traffic is related to a certain type of application, it may be refused by the infrastructure devices 212 and 214. Other type of network traffic may also be denied, dropped, or refused in accordance with the network traffic rules. In examples, the rules may be applied at the application layer, presentation layer, session layer, transport layer, network layer, data link layer, and/or physical layer, as appropriate. In other examples, network traffic may be logged or recorded by the infrastructure device (or an appropriate attached device) but allowed to be received by the infrastructure device. This allows for flexibility and post-mortem analysis if a breach occurs. The network traffic may also be redirected to an analysis engine elsewhere in the network and the network traffic may be then allowed or denied by the infrastructure device based on an analysis performed by the analysis engine.

However, if the end-host 202 sends network traffic directly to the infrastructure device 212, for example, that network traffic is denied, refused, and/or dropped or otherwise treated as discussed herein by the infrastructure device 212 in accordance with the network traffic rules. As shown by the dotted line 206 in FIG. 2, the network traffic is refused by the infrastructure device 212. This prevents unauthorized, potentially harmful network traffic from being received by the infrastructure device 212, which could then potentially infect other devices (such as infrastructure device 214) within the network 210. Similarly, if any other end-host (such as end-host 204) sends network traffic directly to any of the infrastructure devices (such as infrastructure device 212 and/or infrastructure device 214), the traffic may be denied by the infrastructure device.

Figure 3:
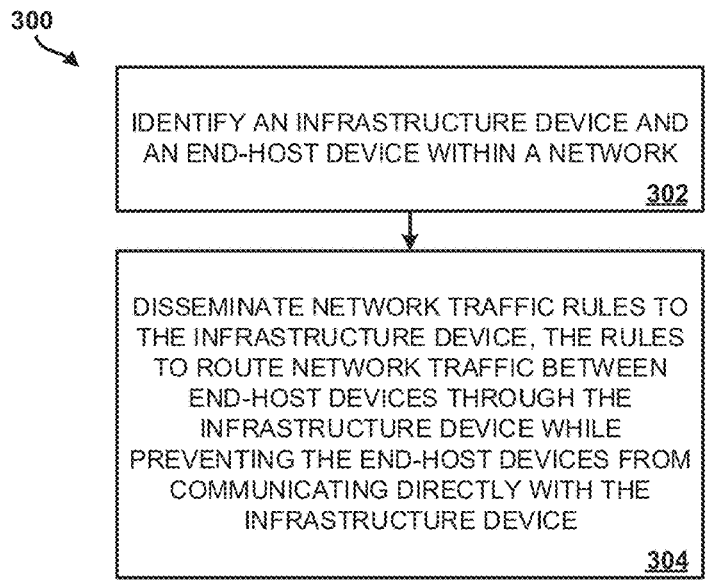
FIG. 3 illustrates a flow diagram of a method for transmitting network traffic in accordance with network traffic rules according to examples of the present disclosure.

FIG. 3 illustrates a flow diagram of a method 300 for transmitting network traffic in accordance with network traffic rules according to examples of the present disclosure. The method 300 may be executed by a computing system or a computing device such as the network traffic rules controller 120 and/or 220 of FIGS. 1 and 2 respectively. In one example, method 300 may include: identifying an infrastructure device and an end-host device within a network (block 302); and disseminating network traffic rules to the infrastructure device, the rules to route network traffic between end-host devices through the infrastructure device while preventing the end-host devices form communicating directly with the infrastructure device (block 304).

At block 302, the method 300 includes identifying an infrastructure device and an end-host device within a network. For example, a computing system (e.g., the network traffic rules controller 120 of FIG. 1 and the network traffic rules controller 220 of FIG. 2) identifies an infrastructure device (e.g., infrastructure device 112 of FIG. 1 and infrastructure devices 212 and 214 of FIG. 2) and an end-host device (e.g., end-hosts 102 and 104 of FIG. 1 and end-hosts 202 and 204 of FIG. 2) within a network (e.g., network 110 of FIG. 1 and network 210 of FIG. 2).

Identifying the infrastructure device and/or the end-host device within the network may be based, in part or in whole, on the internet protocol (IP) address, media access control (MAC) address, traffic type, and/or application function of the device. Additional devices may also be detected. In examples, the network traffic rules controller 120 may periodically (such as once a day, every hour, every few seconds, or any other appropriate interval) or continuously attempt to identify changes to the infrastructure devices and/or end-host devices, such as the modification, addition, or removal of infrastructure and/or end-host devices. The method continues to block 304.

At block 304, the method 300 includes disseminating network traffic rules to the infrastructure device, the rules to route network traffic between end-host devices through the infrastructure device while preventing the end-host devices from communicating directly with the infrastructure device. For example, the computing system (e.g., the network traffic rules controller 120 of FIG. 1 or the network traffic rules controller of FIG. 2) disseminates network traffic rules to the infrastructure device, the network traffic rules to route network traffic between end-host devices through the infrastructure device. In this example, network traffic transmitted from a first end-host device to a second end-host device is passed through the infrastructure device to the second end-host device in accordance with the network traffic rules. However, network traffic transmitted from the first end-host device to the infrastructure device is blocked by the infrastructure device in accordance with the network traffic rules, thus preventing the first end-host device from communicating directly with the infrastructure device.

In examples, the network traffic rules may be disseminated in a variety of ways. For instance, the network traffic rules may be disseminated manually. The network traffic rules may also be disseminated automatically and may occur in response to a network change (i.e., the addition, removal, or reconfiguration of an infrastructure device). In this way, the network may remain up-to-date by automatically receiving the network traffic rules as soon as a change occurs.

Additional processes also may be included. For example, the method 300 may include generating, by a computing system, the set of network traffic rules prior to disseminating the set of network traffic rules to the infrastructure device. The method 300 may also include identifying, by the computing system, additional infrastructure devices and end-host devices within the network.

It should be understood that the processes depicted in FIG. 3 represent illustrations, and that other processes may be added or existing processes may be removed, modified, or rearranged without departing from the scope and spirit of the present disclosure. It should also be understood that the processes depicted in FIG. 3 may be implemented as programmatic instructions stored on a non-transitory computer-readable storage medium that, when executed by a processing resource of a computing system, cause the processing resource to perform the processes described herein.

Figure 4:
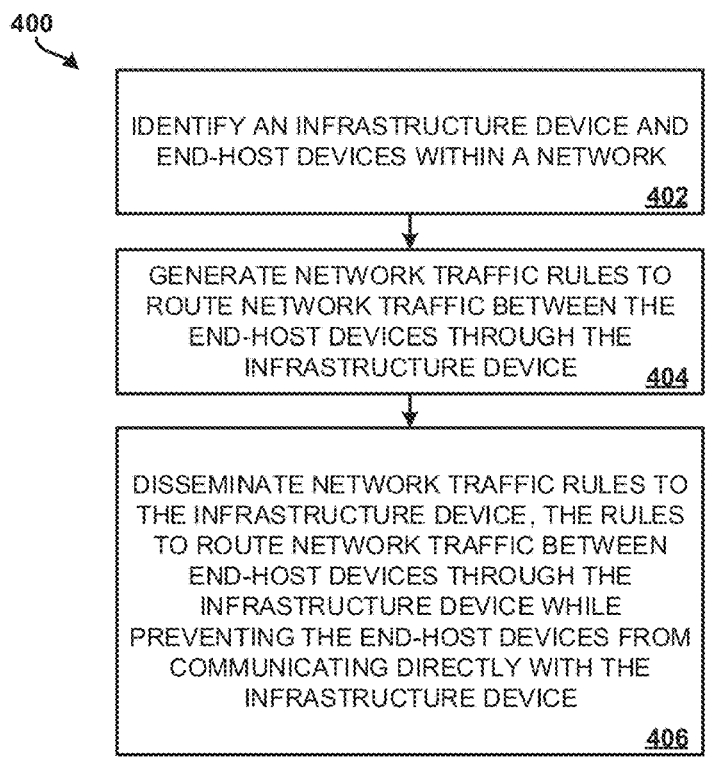
FIG. 4 illustrates a flow diagram of a method for transmitting network traffic in accordance with network traffic rules according to examples of the present disclosure.

FIG. 4 illustrates a flow diagram of a method 400 for transmitting network traffic in accordance with network traffic rules according to examples of the present disclosure. The method 400 may be executed by a computing system or a computing device such as the network traffic rules controller 120 and/or 220 of FIGS. 1 and 2 respectively. In one example, method 400 may include: identifying an infrastructure device and end-host devices within a software defined network (block 402); generating network traffic rules to route network traffic between the end-host devices through the infrastructure device (block 404); and disseminating network traffic rules to the infrastructure device, the rules to route network traffic between end-host devices through the infrastructure device while preventing the end-host devices form communicating directly with the infrastructure device (block 406).

At block 402, the method 400 includes identifying an infrastructure device and end-host devices within a software defined network. For example, a computing system (e.g., the network traffic rules controller 120 of FIG. 1 and the network traffic rules controller 220 of FIG. 2) identifies an infrastructure device (e.g., infrastructure device 112 of FIG. 1 and infrastructure devices 212 and 214 of FIG. 2) and end-host devices (e.g., end-hosts 102 and 104 of FIG. 1 and end-hosts 202 and 204 of FIG. 2) within a software defined network (e.g., network 110 of FIG. 1 and network 210 of FIG. 2).

In examples, the network traffic rules controller 120 may periodically or continuously attempt to identify changes to the infrastructure devices and/or end-host devices, such as the modification, addition, or removal of infrastructure and/or end-host devices. Additional devices may also be detected. In examples, the network traffic rules controller 120 may periodically (such as once a day, every hour, every few seconds, or any other appropriate interval) or continuously attempt to identify changes to the infrastructure devices and/or end-host devices, such as the modification, addition, or removal of infrastructure and/or end-host devices. The method continues to block 404.

At block 404, the method 400 includes generating network traffic rules to route network traffic between the end-host devices through the infrastructure device. For example, a computing system (e.g., the network traffic rules controller 120 of FIG. 1 and the network traffic rules controller of FIG. 2) generates network traffic rules to route network traffic between the end-host devices through the infrastructure device.

Generating the network traffic rules may include a network traffic rules controller as discussed regarding FIGS. 1 and 2 automatically generating the network traffic rules. For example, the network traffic rules controller may generate a rule specifying that all network traffic from an end-host with an Ethernet header specifying a destination MAC address as the MAC address of an infrastructure device be blocked or dropped. Similarly, the network traffic rules controller may generate a rule specifying that all network traffic from an end-host with an Ethernet header specifying a destination IP address as the IP address of an infrastructure device be blocked or dropped. The rules may be generated individually based on the type, address, and/or location of a particular infrastructure device, and the rules may differ from one infrastructure device to another infrastructure device. In examples, the rules may also be manually programed programmed such as by a network administrator. In examples, the network traffic rules may also include infrastructure devices within a certain proximity, address range, type, or feature set as the infrastructure to which the rules are disseminated. For instance, each infrastructure device may want to only protect access to devices which are within a three network hops or on the same subnet, so as to reduce the number of network traffic rules on a per-device basis. The network traffic rules controller would still be aware of the remaining infrastructure devices, in examples.

It should also be understood that the rules may include exceptions, such as for trusted end-hosts. For example, a trusted end-host device may be enabled to communicate directly with an infrastructure device, such as for management purposes. In this way, the trusted end-host device may be treated like another infrastructure device that may communicate with some of all of the other infrastructure devices within the network. The method continues to block 406.

At block 406, the method 400 includes disseminating network traffic rules to the infrastructure device, the rules to route network traffic between end-host devices through the infrastructure device while preventing the end-host devices from communicating directly with the infrastructure device. For example, the computing system (e.g., the network traffic rules controller 120 of FIG. 1 or the network traffic rules controller 220 of FIG. 2) disseminates network traffic rules to the infrastructure device, the network traffic rules to route network traffic between end-host devices through the infrastructure device. In this example, network traffic transmitted from a first end-host device to a second end-host device is passed through the infrastructure device to the second end-host device in accordance with the network traffic rules. However, network traffic transmitted from the first end-host device to the infrastructure device is blocked by the infrastructure device in accordance with the network traffic rules, thus preventing the first end-host device from communicating directly with the infrastructure device.

In examples, the network traffic rules may be disseminated in a variety of ways. For instance, the network traffic rules may be disseminated manually. The network traffic rules may also be disseminated automatically and may occur in response to a network change (i.e., the addition, removal, or reconfiguration of an infrastructure device). In this way, the network may remain up-to-date by automatically receiving the network traffic rules as soon as a change occurs.

Additional processes also may be included, and it should be understood that the processes depicted in FIG. 4 represent illustrations, and that other processes may be added or existing processes may be removed, modified, or rearranged without departing from the scope and spirit of the present disclosure. It should also be understood that the processes depicted in FIG. 4 may be implemented as programmatic instructions stored on a non-transitory computer-readable storage medium that, when executed by a processing resource of a computing system, cause the processing resource to perform the processes described herein.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A method, comprising:
   receiving, by a first infrastructure device within a network, network traffic rules from a controller, wherein the network comprises a number of infrastructure devices, a first end-host device, and a second end-host device; wherein the network traffics rules are disseminated by the controller to a subset of infrastructure devices of the number of infrastructure devices, the subset of infrastructure devices being determined based upon at least one of relative proximity to each other, an address range applicable to the subset of infrastructure devices, a type of each of the subset of infrastructure devices, and a feature set of each of the subset of infrastructure devices;
   in response to determining, by the first infrastructure device based at least on a media access control (MAC) address, that network traffic received from the first end-host device is destined to the second end-host device, allowing the network traffic destined to the second end-host device to pass through the first infrastructure device in accordance with the network traffic rules; and
   in response to determining, by the first infrastructure device based at least on the MAC address, that network traffic received from the first end-host device is destined to a second infrastructure device within the determined subset of infrastructure devices, blocking the network traffic destined to the second infrastructure device in accordance with the network traffic rules.

2. The method of claim 1, further comprising:
   generating, by the controller, the set of network traffic rules prior to the controller disseminating the set of network traffic rules to the subset infrastructure devices.

3. The method of claim 1, further comprising, identifying, by the controller, additional infrastructure devices and end-host devices within the network.

4. The method of claim 3, wherein identifying additional infrastructure devices and end-host devices within the network occurs periodically.

5. The method of claim 1, wherein the controller is configured to identify the number of infrastructure devices and the first and second end-host devices within the network based in part on at least one of an internet protocol (IP) address, a media access control (MAC) address, and an application function.

6. A system, comprising:
   a group of infrastructure devices within a network; and
   a network traffic rules controller communicatively coupled to a first infrastructure device within the group of infrastructure devices, the network traffic rules controller configured to generate network traffic rules to route network traffic between end-host devices through a subset of infrastructure devices of the group of infrastructure devices and configured to disseminate the network traffic rules to the first infrastructure device, the subset of infrastructure devices comprising infrastructure devices each having at least one of a determined relative proximity to each other, an address within a determined address range, a common type, and a common feature set;

wherein the first infrastructure device is configured to, in response to determining, based at least on a media access control (MAC) address, that network traffic received from a first end-host device is destined to a second end-host device, allowing the network traffic destined to the second end-host device to pass through the first infrastructure device according to the network traffic rules; and wherein the first infrastructure device is configured to, in response to determining based at least on the MAC address that network traffic received from the first end-host device is destined to a second infrastructure device within the subset of infrastructure devices, blocking the network traffic destined to the second infrastructure device according to the network traffic rules.

7. The system of claim 6, wherein network traffic passes through the infrastructure devices based at least in part on a media access control (MAC) address.

8. The system of claim 7, wherein the first infrastructure device stores a MAC address forwarding table.

9. The system of claim 6, wherein network traffic passes through the first infrastructure device based at least in part on an internet protocol (IP) address.

10. The system of claim 9, wherein the first infrastructure device stores an IP address forwarding table.

11. The system of claim 6, wherein the first infrastructure device is configured to block the network traffic based in part on an application traffic type.

12. The system of claim 6, wherein the network traffic rules controller identifies devices connected to the network, including at least each infrastructure device in the subset of the infrastructure devices and the end-host devices.

13. A non-transitory computer-readable storage medium storing instructions that, when executed by a processor, cause the processor to:

receive, by a first infrastructure device within a network, network traffic rules from a controller, wherein the network comprises a number of infrastructure devices, a first end-host device, and a second end-host device; wherein the network traffics rules are disseminated by the controller to a subset of infrastructure devices of the number of infrastructure devices, the subset of infrastructure devices being determined based upon at least one of relative proximity to each other, an address range applicable to the subset of infrastructure devices, a type of each of the subset of infrastructure devices, and a feature set of each of the subset of infrastructure devices;

in response to determining, by the first infrastructure device based at least on a media access control (MAC) address, that network traffic received from a first end-host device is destined to a second end-host device, allowing the network traffic destined to the second end-host device to pass through the first infrastructure device in accordance with the network traffic rules, and in response to determining, by the first infrastructure device based at least on the MAC address, that network traffic received from the first end-host device is destined to a second infrastructure device within the subset of infrastructure devices, blocking the network traffic destined to the second infrastructure device in accordance with the network traffic rules.

14. The method of claim 1, wherein, in accordance with the network traffic rules, network traffic from the first end-host device having an infrastructure device in the subset of infrastructure devices as an addressed final destination is blocked to prevent the first end-host device from communicating directly with the infrastructure device.

15. The system of claim 6, wherein the first infrastructure device is configured, in accordance with the network traffic rules, to block network traffic from the first end-host device having an infrastructure device in the group of infrastructure devices as an addressed final destination to prevent the first end-host device from communicating directly with the infrastructure device.

16. The non-transitory computer-readable storage medium of claim 13, wherein the instructions, when executed by the processor, cause the processor to, in accordance with the network traffic rules, block network traffic from the first end-host device having an infrastructure device in the subset of infrastructure devices as an addressed final destination to prevent the first end-host device from communicating directly with the infrastructure device.

17. The system of claim 6, wherein the relative proximity is determined based on residence within the same subnet.

* * * * *